(12) United States Patent
Immonen

(10) Patent No.: US 8,343,358 B2
(45) Date of Patent: Jan. 1, 2013

(54) OIL COMBATTING VESSEL

(75) Inventor: Pauli Immonen, Masku (FI)

(73) Assignee: Mobimar Oy, Turku (FI)

( * ) Notice: Subject to any disclaimer, the term of this patent is extended or adjusted under 35 U.S.C. 154(b) by 249 days.

(21) Appl. No.: 12/739,925

(22) PCT Filed: Oct. 30, 2008

(86) PCT No.: PCT/FI2008/050619
§ 371 (c)(1),
(2), (4) Date: Apr. 26, 2010

(87) PCT Pub. No.: WO2009/056687
PCT Pub. Date: May 7, 2009

(65) Prior Publication Data
US 2010/0252508 A1 Oct. 7, 2010

(30) Foreign Application Priority Data

Oct. 31, 2007 (FI) .................................. 20070827
Mar. 19, 2008 (FI) .................................. 20085239

(51) Int. Cl.
*E02B 15/04* (2006.01)
(52) U.S. Cl. ............... 210/747.6; 210/776; 210/170.05; 210/242.3; 210/923
(58) Field of Classification Search ............... 210/747.6, 210/776, 170.05, 170.09, 170.11, 242.3, 210/923
See application file for complete search history.

(56) References Cited

U.S. PATENT DOCUMENTS

| | | | | |
|---|---|---|---|---|
| 3,753,497 A | * | 8/1973 | Hoffman | 210/242.3 |
| 3,915,864 A | * | 10/1975 | Massei | 210/242.3 |
| 3,959,136 A | | 5/1976 | Ayers et al. | |
| 4,033,876 A | * | 7/1977 | Cocjin et al. | 210/242.3 |
| 4,039,454 A | * | 8/1977 | Miller et al. | 210/242.3 |
| 4,053,406 A | | 10/1977 | Deslauriers et al. | |
| 4,959,143 A | * | 9/1990 | Koster | 210/242.3 |

(Continued)

FOREIGN PATENT DOCUMENTS

CA 1242655 10/1988

(Continued)

OTHER PUBLICATIONS

Written Opinion of the International Searching Authority PCT/FI2008/050619.

(Continued)

*Primary Examiner* — Christopher Upton
(74) *Attorney, Agent, or Firm* — Stiennon & Stiennon

(57) ABSTRACT

A three-hulled oil combatting vessel (500) has a separating structure (100), which pushes ice blocks (J1), which move between the middle hull (SH1) and side hulls (SH2, SH3) from the prow to the stern, underneath the water surface (WL1). The separating structure (100) may be a grate in the longitudinal direction of the vessel (500). The density of the oil (B4) or oil refining product to be collected is smaller than that of the water, so the oil (B3), which has been separated from the ice blocks (J1) that were pushed down, tends to rise through the separating structure (100) to the water surface. The separating structure (100) separates the oil (B3) from the ice blocks (J1) for easier collection into a container. The separated (B4) oil can thus be collected from the relatively ice-free water surface (WL1) with an oil collecting device (200), which may have a brush skimmer.

29 Claims, 8 Drawing Sheets

U.S. PATENT DOCUMENTS

| | | | |
|---|---|---|---|
| 5,022,987 A * | 6/1991 | Wells | 210/242.3 |
| 5,102,540 A * | 4/1992 | Conradi et al. | 210/242.3 |
| 6,015,501 A | 1/2000 | Lundback | |
| 6,592,765 B1 | 7/2003 | Mykkanen | |

FOREIGN PATENT DOCUMENTS

| | | |
|---|---|---|
| EP | 1439119 A1 | 7/2004 |
| FI | 871197 | 9/1988 |
| RU | 2151841 | 6/2000 |
| SU | 981091 | 12/1982 |
| WO | 8503917 A1 | 9/1985 |
| WO | 0053488 | 9/2000 |
| WO | 0136262 | 5/2001 |
| WO | 2007054607 A1 | 5/2007 |

OTHER PUBLICATIONS

International Search Report PCT/FI2008/050619.

* cited by examiner

OIL COMBATTING VESSEL

CROSS REFERENCES TO RELATED APPLICATIONS

This application is a U.S. national stage application of International App. No. PCT/FI2008/050619, filed Oct. 30, 2008, and claims priority on FI 20070827, filed Oct. 31, 2007; and FI 20085239, filed Mar. 19, 2008, the disclosures of all of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to an oil combatting vessel and a method for controlling oil damages with a vessel which has at least a middle hull, a first side hull, and a second side hull.

Oil, which has been spilled from vessels or oil refineries, may cause environmental damages. The oil damage may occur in an environment where a sea, lake or river is covered by an ice cover or ice blocks. Collecting the spilled oil from among the ice in such circumstances is difficult.

Publication EP1439119A1 presents a three-hulled vessel, between the middle hull and side hulls of which there are oil collecting devices.

Publication WO2007054607 presents a three-hulled vessel, which is suitable for breaking ice.

Publication U.S. Pat. No. 6,592,765 presents an oil separating apparatus, which has a vibrating screen, attachable to the vessel, for pushing ice blocks underneath the water surface. The oil is separated from the ice blocks, which have been pushed down, by vibrating the screen against the ice blocks. The screen may be vibrated for example with the aid of an asymmetric mass or a connecting rod.

The apparatus according to publication U.S. Pat. No. 6,592,765 must be dimensioned to be heavy, so that it will withstand, without breaking, the stress forces caused by the ice, especially when operating beside a one-hulled vessel. The screens according to publication U.S. Pat. No. 6,592,765 have so far had a basal area of a few square meters. A powerful vibrating machinery is needed for moving a large and heavy screen. Since the size of the vibrating screen is limited, the vibrating machinery must be able to move the heavy screen with such an amplitude and frequency, which significantly intensifies the separation of the oil from the ice blocks. The vibration of the screen may form small ice blocks and ice sludge, which, when they have risen to the water surface through the screen, may make the collecting of oil more difficult.

SUMMARY OF THE INVENTION

The object of the present invention is to provide a vessel and a method for collecting oil from a water area covered by ice or ice blocks.

The oil combatting vessel according to the invention is a multi-hulled vessel, which comprises at least a middle hull and side hulls on both sides thereof. The oil combatting vessel according to the invention has a separating structure, which pushes ice blocks, which move between the middle hull and side hulls from the prow to the stern, or fast ice, underneath the water surface when the vessel is moving. Said structure may for example be a grate in the longitudinal direction of the vessel. The purpose of the separating structure is to push the ice downwards, but at the same time allow the water and oil to pass through the separating structure to the essentially ice-free waters. The separating structure thus separates the oil from the ice blocks, whereby the collecting of the oil for example into a container is made significantly easier. The separated oil can thus be collected from the relatively ice-free water surface with an oil collecting device, which may be for example a brush skimmer.

The density of the oil or oil refining product to be collected is smaller than that of the water, so the oil, which has been separated from the ice blocks that were pushed down, tends to rise through the separating structure to the water surface. In an embodiment this phenomenon is used to reduce the water content of the oil/water mixture, which is processed with the oil collecting device. Reducing the water content of the mixture facilitates the separation of oil from the water. The oil/water mixture can also be transferred almost as such to the container in the vessel, whereby a reduction in the water content of the mixture reduces the volume of the necessary container.

According to one embodiment the oil collecting device is above the separating structure.

In one embodiment the separating structure, which is installed between the hulls, can be long in relation to the length of the side hull. By using a long separating structure, the oil collecting efficiency and/or oil collecting performance can be increased.

In many situations, an acceptable collecting efficiency can be obtained simply by pushing ice blocks underneath the water surface with a separating structure, which is attached between the hulls of the vessel, and which is slanting at its front edge, especially if a long separating structure is used. The separating structure can be immobile in relation to the vessel, i.e. it is not actively moved in relation to the hulls of the vessel during oil collecting, with the exception of possible procedures to correct the position. The separation of oil from ice blocks with the aid of said separating structure thus does not necessarily require that the underside of the separating structure be actively vibrated against the ice blocks.

It must still be noted that even if the separating structure were not actively vibrated, the vibration caused by hitting the ice and by the propulsion device of the vessel is typically still partly conveyed also to the separating structure. The passively vibrating separating structure vibrates essentially only by the influence of the forces caused by the ice blocks and/or the vibration of the propulsion device of the vessel. Breaking fast ice, hitting ice blocks and/or the buoyancy of the ice blocks cause forces that vary in time, which are here called forces caused by ice blocks. The vibration of the propulsion device can be caused for example by the engine, propeller and/or axis.

An immobile or passively vibrating separating structure can typically be built to be more resistant and/or their surface area can be larger than in a structure, which is connected to a vibrating machinery. The separating structure can be dimensioned to be so heavy that it can be used to push large and heavy slates of ice and/or for temporary ice breaking. The immobile or passively vibrating separating structure, which is sheltered between the hulls, can be dimensioned to be long, whereby the separated oil has as long a time as possible to rise towards the water surface.

According to an embodiment the vessel is a three-hulled vessel designed especially for ice breaking, whereby the separating structures are situated in shelter between the middle hull and side hulls of the vessel. The vessel can be arranged so that it breaks mainly only quite large ice blocks from the fast ice, which ice blocks do not substantially get through the grate in the separating structure. In many situations an adequate collecting efficiency can be obtained by pushing said large ice blocks underneath the water surface with the aid of the immobile or passively vibrating separating structure. The immobile or passively vibrating separating structure breaks off from the large ice blocks an as small amount as possible of small blocks and/or ice sludge, which, when they have risen through the separating structure to the water surface, could make the collecting of oil more difficult.

According to an embodiment the vessel is used to collect oil under circumstances, where the ice is already in blocks. Also thereby an advantage is obtained by the fact that the vessel has many hulls, even though the vessel does not necessarily need to be optimized for breaking ice. The separating structure can then be installed in a sheltered place between the hulls of the vessel, and height variations at the oil collecting device caused by swell of the sea can be minimized.

When the vessel is moving, swirls and flows may arise in the water, as a result of which ice blocks and ice sludge tends to travel especially from the rear end of the separating structure onto the separating structure, thus making collecting the oil, which has risen to the water surface through the separating structure, more difficult. According to an embodiment of the invention the rear part of the separating structure is formed so that when the vessel is moving, the passing of ice blocks and ice sludge onto the separating structure is essentially hindered. The separating structure can be formed to be for example a plate-like structure, which is slanting at its rear part and rising towards the stern of the vessel. Typically the rear part of the separating structure is water permeable, so that the water can flow through the separating structure and so that the structure would not create forces, which disturb the travel of the vessel. The rear part of the separating structure can be arranged to be mobile so that ice blocks and ice sludge, which have possibly gathered on the separating structure, can easily be removed. For example the inclination angle of the plate-like rear part can be arranged to be adjustable.

According to an embodiment the oil, which has risen to the water surface through the separating structure, is guided with an oil boom to the oil collecting device in the middle hull. The guiding boom may be placed diagonally in relation to the travel direction of the vessel, whereby the movement of the vessel moves oil, which has risen to the surface and gathered against the boom, towards the middle hull of the vessel.

According to an embodiment of the invention, the vessel is attached essentially in its place in relation to the bottom of the waters, in order to collect oil from a water area covered by ice or ice blocks. The water around the vessel is moved so that the flows guide the oil in the water toward the prow of the vessel and onwards toward the separating structure attached between the middle hull and side hull. The separating structure separates the oil from the ice blocks. The oil, which has separated and risen toward the surface, is collected into a container, for example using a pump.

At least one attaching means, such as a locking pole or anchor, is used for attaching the vessel in relation to the bottom of the waters. The propulsion device or devices of the vessel are preferably used for achieving a flow. A separate device, with which a desired flow is produced, may also be used as an alternative or in connection with the propulsion device or devices of the vessel.

The invention and its central characteristics as well as the advantages, which can be achieved with the aid of the invention, will become clearer to one skilled in the art in the claims and in the following description, where the invention is described in further detail with the aid of a few selected examples.

In the following, the invention will be described in more detail with reference to the appended schematic drawings.

DESCRIPTION OF THE PREFERRED EMBODIMENTS

The separating structure according to the invention is suited for use especially in a three-hulled vessel, i.e. a trimaran. It is preferable if the vessel is further able to break fast ice.

Figure 1A:
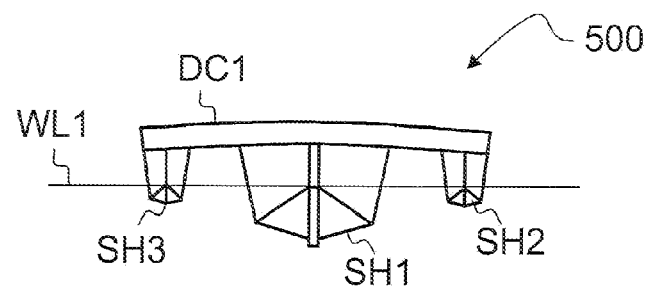
FIG. 1a shows a three-hulled vessel seen from the front.
Figure 1B:
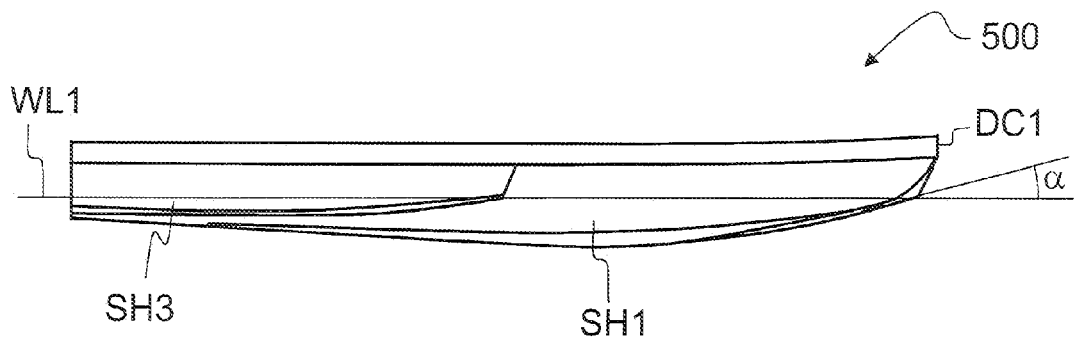
FIG. 1b shows the three-hulled vessel of FIG. 1a seen from the side.
Figure 1C:
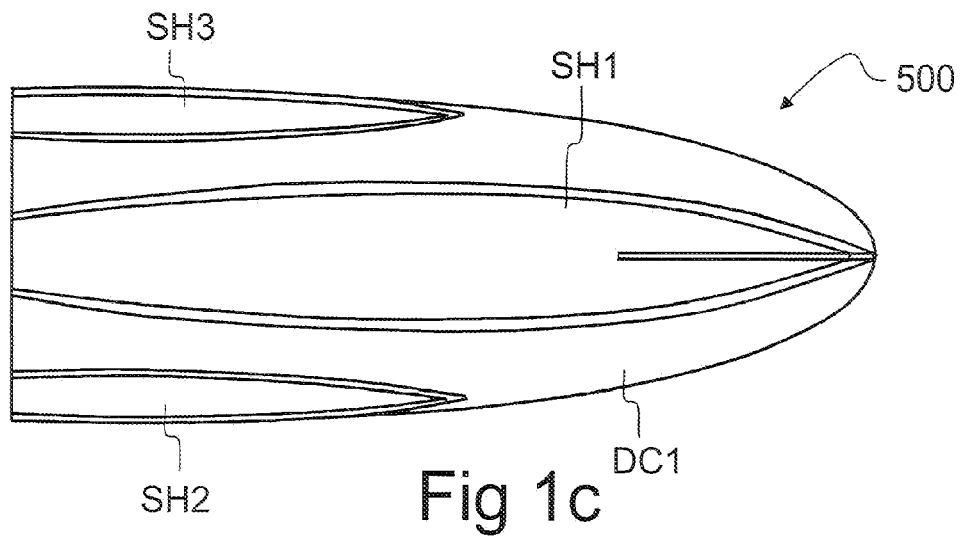
FIG. 1c shows the three-hulled vessel of FIG. 1a seen from the bottom.

Referring to FIGS. 1a-1c, the three-hulled vessel 500 comprises a middle hull SH1, a right-side side hull SH3 and a left-side side hull SH2. The hulls SH1, SH2, SH3 can be connected to each other by the deck DC1. WL1 refers to the level of the water surface. The angle between the keel and the water surface is α. If there is no keel, the angle α means the angle between the bottom of the middle hull SH1 and the water surface at the height of the water surface WL1.

Figure 2:
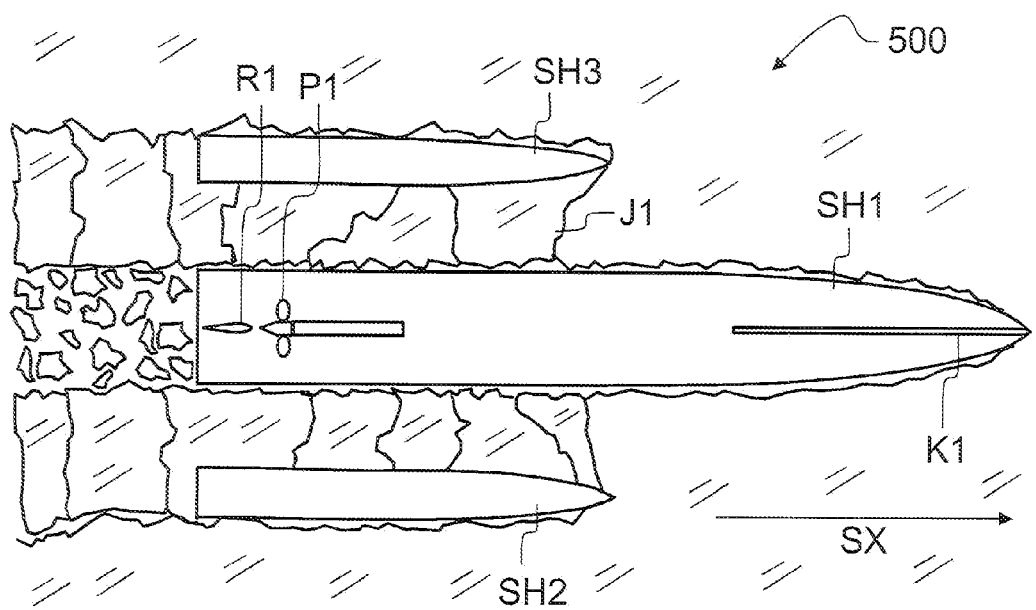
FIG. 2 shows the three-hulled vessel of FIG. 1a seen from the bottom when it is breaking ice.

Referring to FIG. 2, the vessel 500 can be dimensioned to be suited especially for breaking fast ice. The prow of the side hulls SH2, SH3 can be situated essentially further back than the prow of the middle hull SH1, whereby the side hulls, which glide on top of the ice, can break blocks J1 from the ice on both sides of the middle hull SH1 using a relatively small amount of force. The side hulls SH2, SH3 easily break off blocks from the fast ice, as the fast ice no longer supports the blocks to be broken from the side of the middle hull SH1.

The side hulls SH2, SH3 also do not need to go completely through the ice, but typically it is enough that the side hulls just bend the ice blocks J1 off from the fast ice. The draught of the side hulls SH2, SH3 can thus be significantly smaller than that of the middle hull SH1.

The middle hull SH1 can break ice using the principle known from conventional ice breakers. The middle hull SH1 can have a protruding keel. K1, which makes the breaking of the ice more effective. The angle α between the keel and the water surface can be selected to be low-gradient so that the middle hull SH1 breaks ice essentially by pushing ice underneath it. The angle α can be for example in the range 10-25°. Because of its low-gradient incidence angle, the front part of the middle hull SH1 rises partly onto the ice in icy conditions and breaks the ice by pushing it downwards. The energy needed for breaking is thus remarkably smaller than in a case, where ice would be rammed to pieces essentially in the direction of the water surface WL1. Also the angle of the side hulls SH2, SH3 in relation to the water surface WL1 can be selected for example in the range 10-25° so that they easily push ice underneath them.

Ice blocks J1 can also end up underneath the hulls SH1, SH2, SH3 of the vessel 500, but these blocks are not shown in FIG. 2 for the purpose of simplifying the figure.

SX means the main travel direction of the vessel and the direction of the middle hull SH1.

The vessel 500 has at least one propulsion device P1, and possibly also a rudder R1. There can be two or more propulsion devices P1, whereby the sometimes asymmetric forces, which the ice directs toward the side hulls SH2, SH3, can effectively be compensated. In the stern of the middle hull there can be two or more propellers essentially beside each other. The direction of the propeller axis of the propulsion devices may be turnable 180 or even 360 degrees. The propulsion device can be for example an Azipod (a trademark of the company ABB) or an Aquamaster (a trademark of the company Rolls Royce).

The propulsion device or devices P1 are preferable situated in the middle hull SH1, since the side hulls SH2, SH3 do not necessarily reach through the ice.

The three-hulled ice breaker according to the FIGS. 1a-2 is presented for example in the patent publication WO2007054607. The three-hulled ice breaker shown especially in FIGS. 1a-2 or in patent publication WO2007054607 can be equipped with the oil separating devices and oil collecting devices presented below.

Figure 3A:
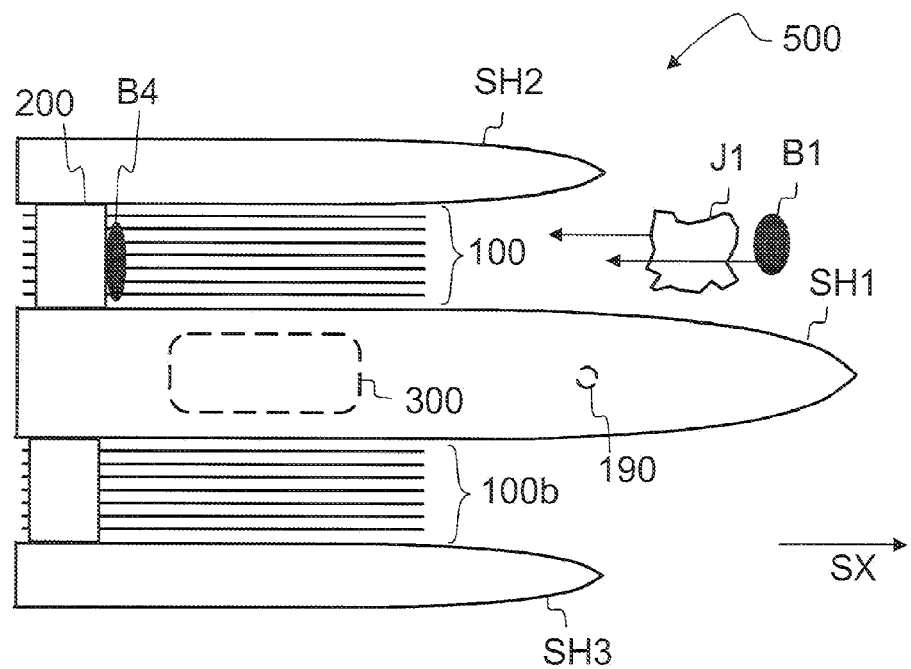
FIG. 3a shows a three-hulled vessel seen from above, whereby said vessel has a grate for pushing and holding ice blocks underneath the water surface, and an oil collecting unit.

Referring to FIG. 3a, there may be a separating structure 100 between the middle hull SH1 and the side hull SH2, which separating structure pushes ice blocks moving between the middle hull SH1 and side hull SH2 underneath the water surface when the vessel 500 is moving, and which holds said ice blocks under the water surface for a long enough time, so that the oil B1 has time to separate from the ice blocks J1 and rise towards the surface. The separating structure 100 is advantageously a grate. Between the middle hull SH1 and the second side hull SH3 there is preferably a second similar separating structure 100b, so that oil can be collected from a wider area and so that the forces, which the ice exerts on the vessel 500, would be as symmetric as possible.

Oil, which has separated and risen toward the surface, moves in relation to the vessel 500, whereby it can gather for example against the oil collecting unit 200 into an oil speck B4, which can be handled with said oil collecting unit 200. The oil collecting unit can separate water, which has possibly been collected with the oil B4, and the oil B4 can be pumped with a pump into a container 300. In some cases the mixture of oil and water may also be collected into the container 300 as such. This can be done for example in small oil spills.

In the bottom of or on the sides of the middle hull SH1 of the vessel 500 there may be at least one air duct 190, with the air blown from which the transfer of the oil at the bottom through the separating structure 100 can be made more effective.

Figure 3B:
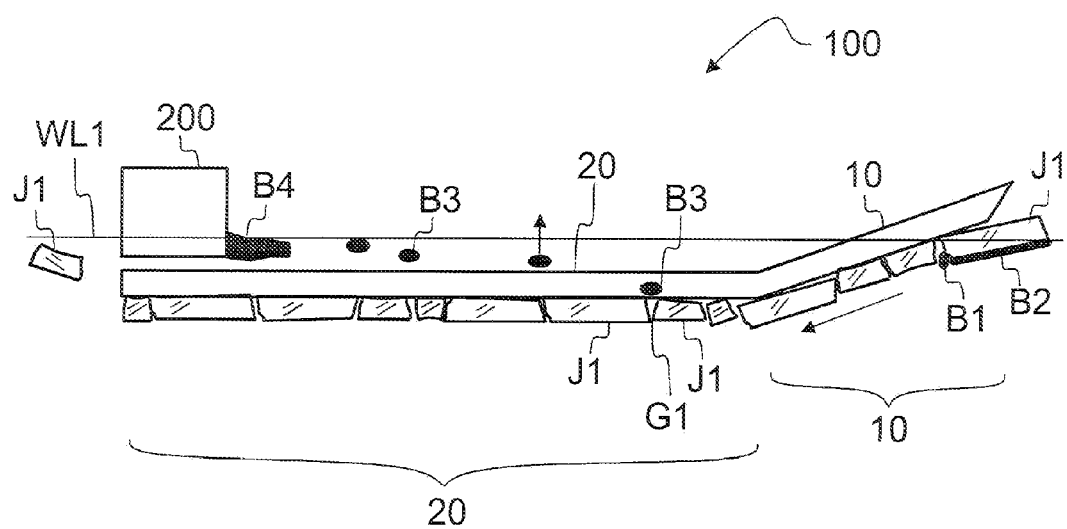
FIG. 3b shows the grate and oil collecting unit according to FIG. 3a seen from the side.

FIG. 3b shows a side view of the separating structure 100 according to FIG. 3a. The separating structure 100 has a first structure part 10, which is fitted to push ice blocks J1, which move between the middle hull SH1 and the side hull SH2 from the prow to the stern, underneath the water surface when the vessel 500 is moving. The separating structure 100 has a second structure part 20, which is fitted to hold the ice blocks J1, which move between the middle hull SH1 and the side hull SH2, underneath the water surface when the vessel 500 is moving. Said second structure part 20 is preferably at least partly water and oil permeable. In order to reduce the resistance to motion and to improve the collecting efficiency it is preferable that also said first structure part 10 is at least partly water and oil permeable. Said first 10 and second structure part 20 can for example be parts of the same grate.

The first structure part 10, which pushes ice J1 downwards, also functions as a structure, which holds ice blocks underneath the water surface, but the second structure part 20, which holds ice down, does not necessarily need to be able to alter the height position of the ice.

The underside of the part 10 can be at an angle β in relation to the water surface WL. The underside of the part 20 can be essentially horizontal. Although the lower angle between the parts 10, 20 shown in FIG. 3b is sharp, the separating structure 100 may also be in the shape of a runner of a sledge when seen from the side. The radius of curvature of the point of connection of the parts 10, 20 can, in order to promote the gliding of the ice, be for example larger than or as large as 0.2 m. The curvature can also minimize the breaking off of small ice blocks from the larger ice blocks J1 gliding underneath. Small ice blocks and ice sludge may obstruct the collecting of the separated oil from the water surface WL1.

If the first structure part 10 is water and oil permeable, then the oil among the ice J1 may get to pass almost straight through the part 10, for example the grate, in the direction of the water surface WL1, when the vessel 500 is moving forward. The oil among the water does thus not necessarily need to be pushed deeper, whereby one would have to wait for the oil to rise back up to the surface or towards the surface.

The part 10 and/or 20 may have openings or gaps, which go through the separating structure 100, so that the portion of said openings or gaps of the surface area of the underside of the part 10, 20 is for example at least 30%, preferably at least 60%.

The oil may be in specks B1 between the ice blocks or as specks B2 on the surfaces of the ice blocks. The density of the oil or oil raffinate to be collected is smaller than the density of the water, so the oil tends to rise upwards through the openings in the separating structure 100. The oil B3, which has separated from the ice, can rise all the way to the water surface. The oil, which has separated from the ice, can be collected also already before the oil makes it up to the surface. The separated oil B3 may gather in front of the oil collecting unit into a speck B4, which can be collected with the oil collecting unit 200.

By collecting efficiency is in this context meant how large a mass of oil can be collected during a unit of time.

By collecting performance is in this context meant the mass of oil collected by the vessel 500 in relation to the total mass of oil present in the area of ice broken by the vessel 500. The area of broken ice is as large as the width of the broken passage times the length of the passage.

The separated oil B3 may rise in the water relatively slowly. The collecting performance may to some extent be increased by selecting a slow travel speed for the vessel 500. The problem may however thus be that the collecting efficiency may be reduced.

When controlling oil damages one can strive to drive the vessel 500 with an optimal travel speed, which maximizes the collecting efficiency. This optimal travel speed can be defined for example with the aid of test drives, miniature model tests and/or simulations.

Figure 3C:
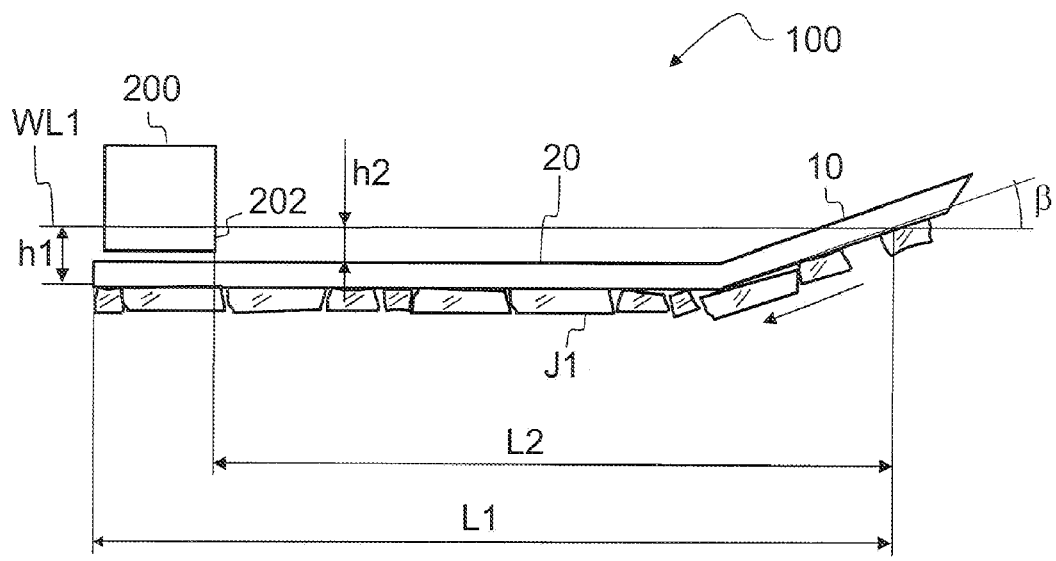
FIG. 3c shows some measurements of the grate according to FIG. 3b.

Referring to FIG. 3c, the ice blocks J1 are held underneath the water surface for a predetermined amount of time, which can be for example longer than or as long as 10 s, or even longer than or as long as 60 s. To arrange this, the length L1 of the part of the separating structure 100, which is under the water surface, can be for example larger than or as large as 15% of the length of the middle hull's SH1 length along the water line. The length L1 of the part of the separating structure 100, which is under the water surface, can preferably be larger than or as large as 30% of the middle hull's SH1 length along the water line or larger than or as large as 60% of the side hull's SH2 length along the water line. If the oil intake point 202 of the oil collecting unit 200 is not right at the stern, the distance L2 is significant with regards to the retention time, which distance L2 is the distance between on the one hand the intersection point of the separating structure 100 and the water surface WL1 and on the other hand said oil intake point 202. Also the distance L2 can be larger than or as large as 15% of the middle hull's SH1 length along the water line. The distance L2 can preferably be larger than or as large as 30% of the middle hull's SH1 length along the water line or larger than or as large as 60% of the side hull's SH2 length along the water line. The distance L2 may for example be larger than or as large as 10 m.

The length of the separating structure 100 may preferably be smaller than the side hull's SH1 length along the water line. The rear part of the separating structure 100 is better sheltered from the stress caused by the ice if it is completely between the middle hull SH1 and the side hull SH2, than if the separating structure 100 were protruding from the stern of the vessel 500. The rear ends of the side hulls SH2, SH3 can protrude in the longitudinal direction of the vessel 500 essentially to the same level as the rear end of the middle hull SH1. The front part of the separating structure 100 starts to press ice blocks J1 downwards preferably only after the side hull SH1 has broken off a block J1 from the fast ice.

In order to maximize the collecting efficiency it is preferable that the height difference h1 between the underside of the separating structure 100 and the water surface WL1 is preferably as small as possible, for example smaller than 50 cm.

In some situations it may be that also the separating structure 100 must be used to break ice. Thereby it is preferable that the separating structure 100 is dimensioned to be adequately heavy. This limits the minimal value of the height difference h1.

The angle β between the underside of the structure 10, which pushes ice blocks downwards, and the water surface WL1 at the height of the water surface WL1 can be for example in the range 5-35°, preferably in the range 10-30°, and even more preferably in the range 10-15°.

The height difference h2 between the water surface WL1 and the upper surface of the structure 20, which holds the ice blocks down, can at least by the oil collecting unit or oil guiding boom 30 (FIG. 4a) be preferably larger than 10 cm. This enables the bottom part of the oil collecting unit 200 being completely in the water, whereby the oil collecting unit 200 can be structurally simple. The oil collecting unit 200 may for example have a brush skimmer, i.e. a brush peeler.

If the water surface is, instead, lower than the upper surface of the structure 20, which holds ice blocks down (the height difference h2 is negative), then the brushes of the possibly used brush skimmer must reach to sweep the water surface between the rails of the grate.

The separating structure 100 may for example be a grate, made up of several adjacent rails or beams. Said rails are preferably essentially in the direction of the middle hull SH1. The vertical measurement of the rails may be smaller at the rear than at the front, since also the probable stress caused by the ice is smaller in the rear than in the front.

Figure 3D:
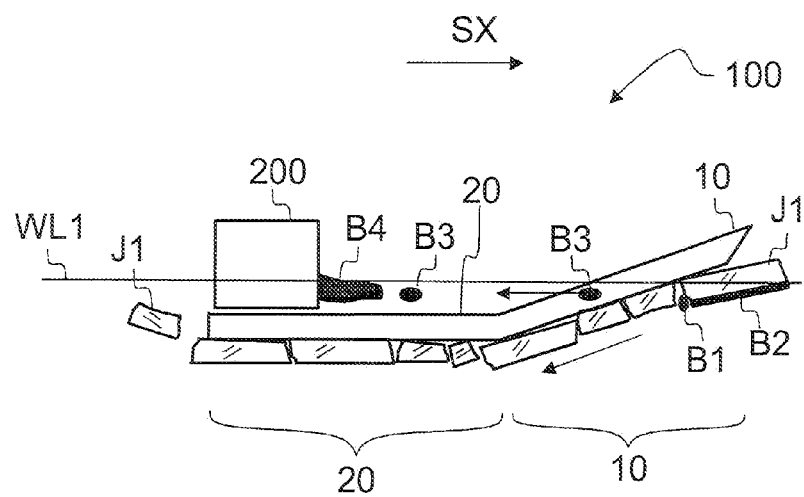
FIG. 3d shows a separating structure, the part which presses down ice blocks of which is oil and water permeable.
Figure 4A:
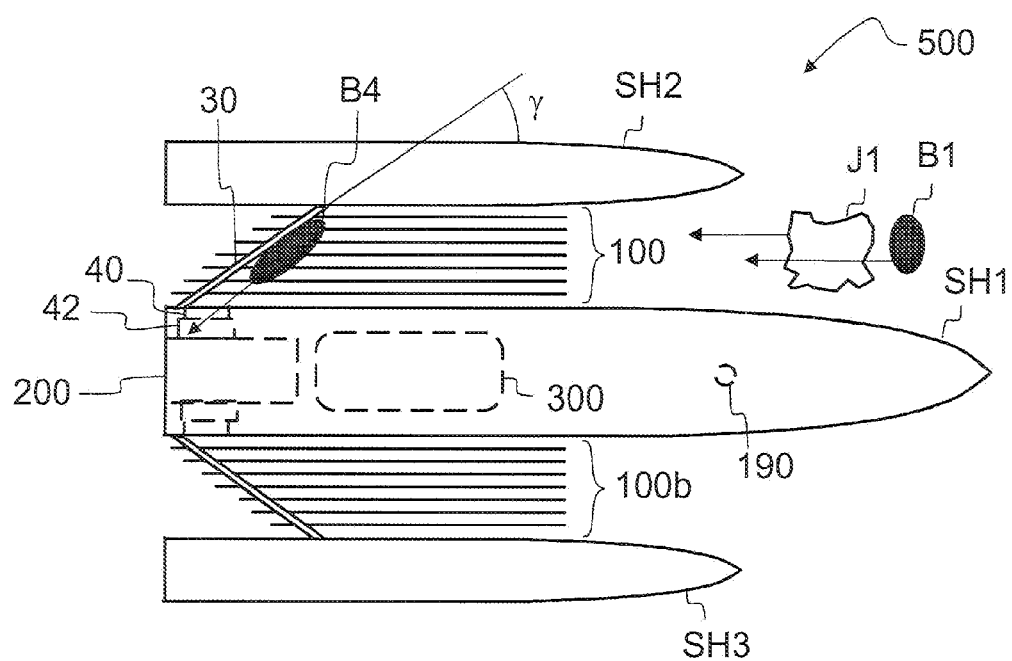
FIG. 4a shows a three-hulled vessel seen from above, whereby said vessel has a grate and an oil guiding means for guiding the oil which separates from the ice blocks to the oil collecting unit in the middle hull.

Referring to FIG. 3d, the part 10 of the separating structure 100, which pushes down ice blocks J1, may be oil B3 and water permeable. When pushing down fast ice or ice blocks J1 at least a part of the oil B1, B2 on the surfaces of or between said blocks J1 is separated from the ice, whereby the separated oil B3 can now pass along with the water in the direction of the vessel through the part 10 and onwards to the oil collecting unit 200 or oil guiding boom 30 (FIG. 4a). The oil to be separated does thus not necessarily need to be pushed deeper along with the ice blocks J1 and to then rise back up again, but instead the oil can pass through the grate essentially at the same depth it was in, when it was among the ice.

If the structure part 10 is oil and water permeable, then the structure part 20, which holds ice down, may be short and/or oil and water impermeable. If the oil collecting unit is placed immediately after the first part 10 or above it, then the second part 20 is not necessarily even needed. However, if the time between the separating from the ice, which takes place with the structure part 10, and the arrival at the oil collecting unit 200 is short, then the separated oil B3 does not necessarily have time to rise significantly towards the water surface WL1. Thereby the oil/water mixture arriving at the oil separating unit 200 may be bland, which may require a large capacity from the oil separating unit 200. If the capacity of the oil separating unit 200 is large enough, however, then the travel speed of the vessel 500 does not necessarily need to be limited at least in order to ensure enough time for the oil to rise to the surface.

Even if the second part 20 was oil and water impermeable, then as long a time as possible can be arranged also in that case for the oil to rise towards the surface, by selecting a second structure part 20, which is as long as possible.

If the structure part 20, which holds the ice blocks J1 down, is oil and water permeable, then the part 10, which pushes ice blocks J1 down, can in principle also be a steel plate, which is oil and water impermeable and set in for example an angle β. However, the most optimal collecting efficiency and performance is thereby not reached. Additionally the resistance to motion is thereby large.

With the combination of a separating structure 100 and an oil separating unit 200, both above-presented oil separating principles are preferably utilized, i.e. the tendency of the oil among the ice to stay still in the water as the ice is pushed down and the tendency of the oil to rise towards the surface over time. Both the structure part 10 and the structure part 20 are thus preferably water and oil permeable. The structure part 10 should preferably let through at least the oil, which travels through in the opposite direction to the travel direction SX of the vessel, and the structure part 20 should preferably let through at least the oil, which rises diagonally upwards or perpendicularly upwards through the part 20.

Referring to FIG. 4a, the oil collecting unit 200 can be situated also in the middle hull SH1. The vessel 500 may have an oil guiding structure 30, which is diagonal in relation to the travel direction, for collecting the risen oil B4 and transferring it via the opening 40 in the side of the middle hull SH1 to the oil collecting unit. The oil can be separated from the water in the oil collecting unit 200, and the separated oil can be pumped into the container 300. The separated water can be returned into the sea.

The angle γ between the guiding means 30 and the travel direction can be for example in the range 10-70°.

The vessel 500 can have at least one pump 42 for suctioning the oil B4 or oily water from the sides of the hull SH1, SH2, SH3 to the collecting unit 200. The vessel 500 can have at least one pump for removing the water, which has passed through the collecting unit 200, back into the sea. Said suctioning pump 42 can also function as the pump, which removes water into the sea.

Figure 4B:
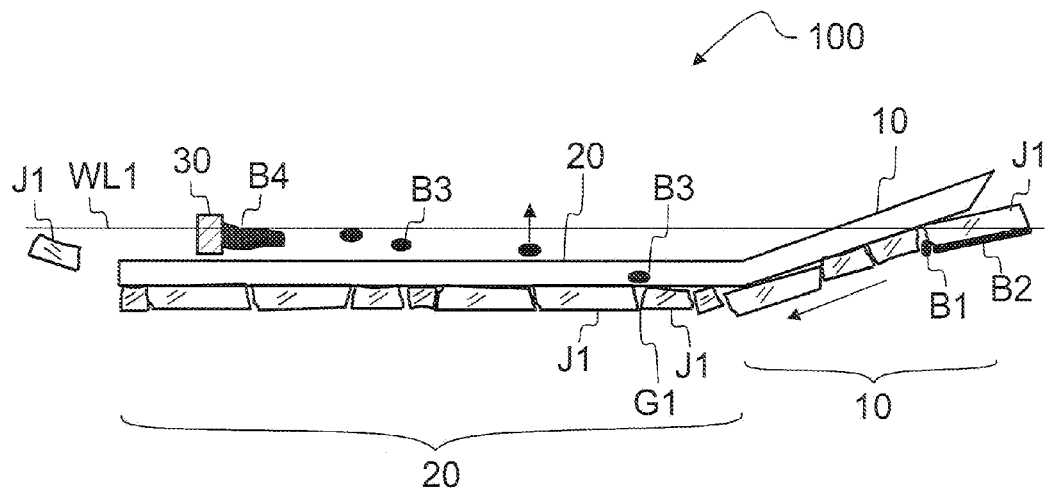
FIG. 4b shows the grate and oil guiding structure according to FIG. 4a seen from the side.

In FIG. 4b is shown the situation of FIG. 4a as seen from the side. The oil guiding structure 30 captures the risen oil B4 and guides it to the oil collecting unit in the middle hull SH1 while the vessel 500 is travelling forwards.

Figure 4C:
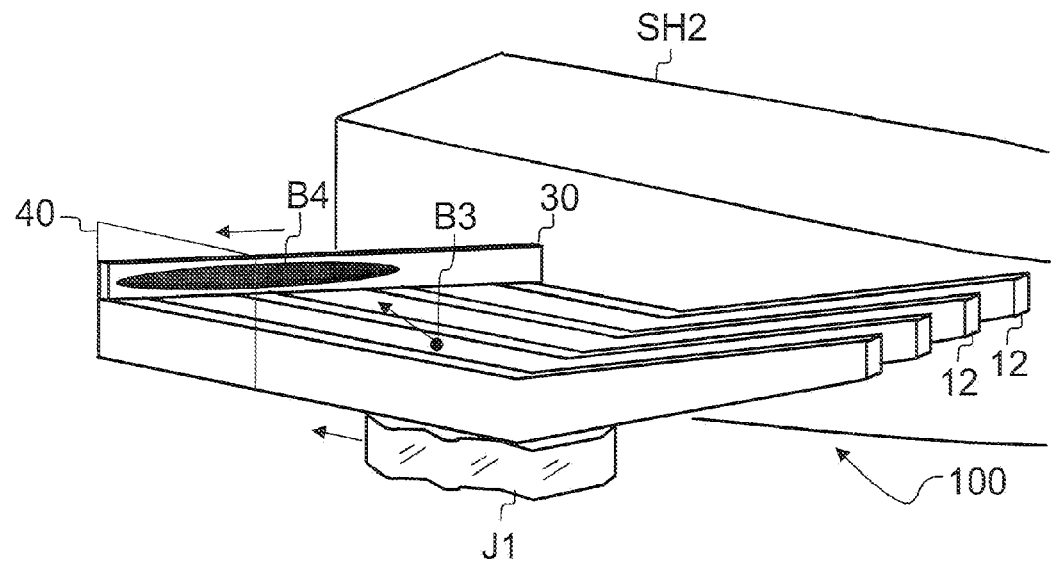
FIG. 4c shows an oil guiding boom in a three-dimensional manner.

In FIG. 4c is shown the situation of FIG. 4a as a three-dimensional view. The separating structure 100 may thus comprise a grate formed out of several adjacent slide rails 12. The oil B3 is able to rise from the gaps between the rails essentially straight upwards in relation to the water and diagonally backwards in relation to the moving separating structure 100. The oil on the water surface can pass straight between the rails 12 essentially in the direction of the water surface WL1.

Figure 5A:
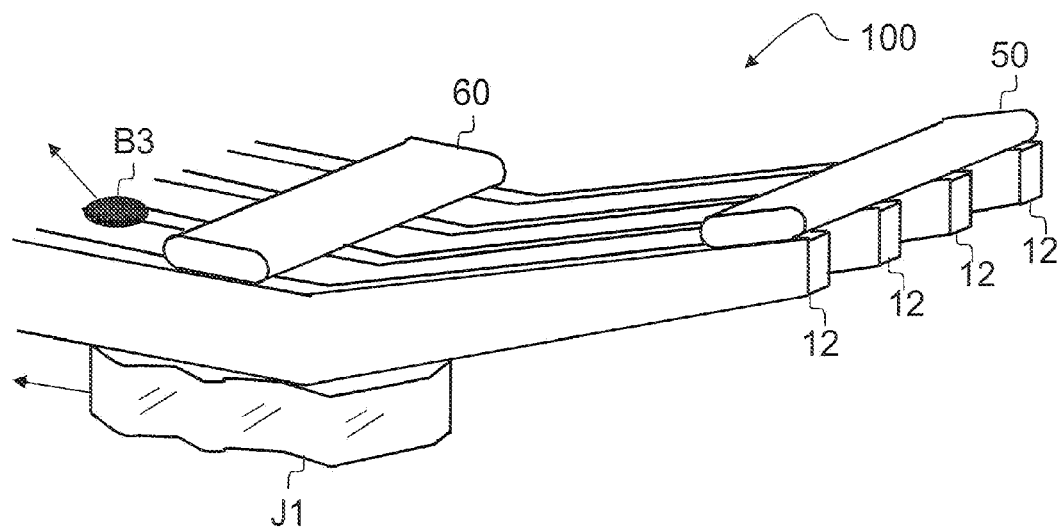
FIG. 5a shows the transverse supports of the grate in a three-dimensional manner.

Referring to FIG. 5a, the rails 12 of the separating structure 100 may be joined together with transverse beams 50, 60. The ice blocks J1 glide along the underside of the rails 12, and the separated oil B3 can rise from between the rails 12.

The shape of the cross-sectional surface of the transverse supports 50, 60 can be selected so that the flow resistance is small and/or so that the transverse supports do not collect ice sludge in front of them.

Figure 5B:
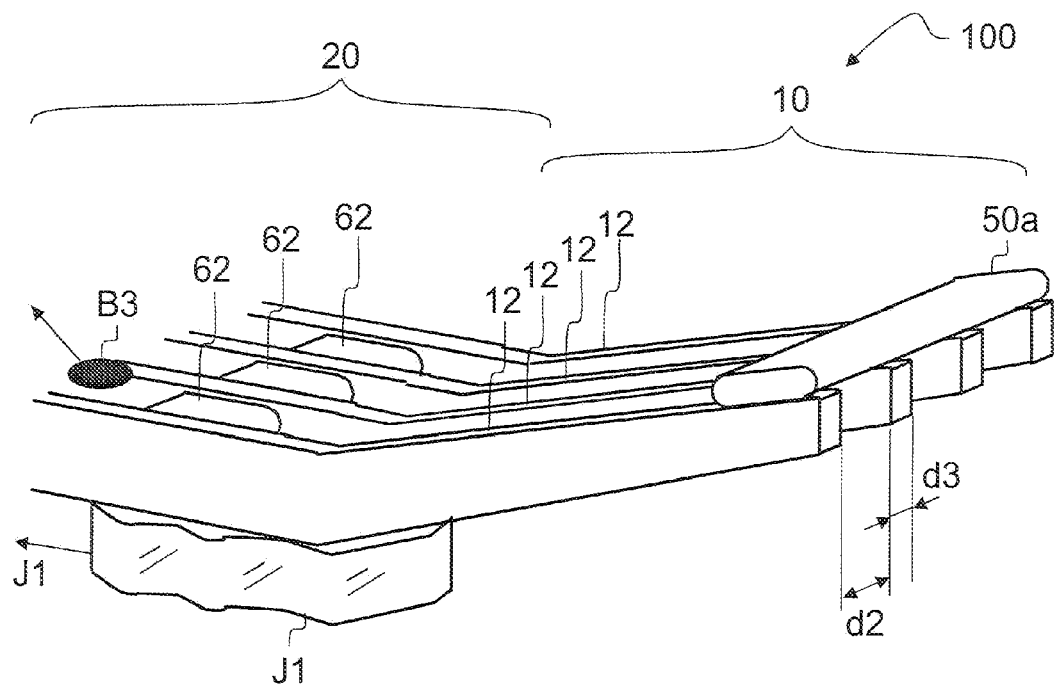
FIG. 5b shows in a three-dimensional manner the transverse supports of the grate, whereby also the upper surface of the grate is essentially smooth.

Referring to FIG. 5b, the transverse supports 62 of the part 20, which holds ice blocks down, can be placed between the rails 12, so that also the upper surface of the rails is smooth in the travel direction of the vessel 500. Thus the likelihood of the transverse supports 62 collecting ice blocks in front of them, which have possibly passed through the rails, can be reduced.

The gap d2 between the rails is preferably in the range 5-10 cm. If the gap d2 is too large compared to the thickness of the ice blocks or the thickness of the fast ice to be broken, then ice blocks J1 may pass between the rails 12 of the grate. The ice blocks, which have passed through, may harm the operation of the oil guiding means 30 and/or the oil collector 200.

An advantage of the ice-breaking three-hulled vessel 500 according to FIGS. 1a-2 is that the broken ice blocks J1, which move between the hulls SH1 and SH2, are mainly relatively large in size. Thus the likelihood that the ice blocks J1 would pass to a significant extent through the gaps between the rails 12 is reduced.

The vessel 500 can be dimensioned so and the speed and travel depth of the vessel 500 in relation to the thickness of the fast ice to be broken can be selected so that the average diameter of the ice blocks J1, which are pushed down with the aid of the first structure part 10, can be for example larger than or as large as a third of the distance between the middle hull SH1 and side hull SH2 of the vessel. The average diameter is calculated as a weighted average of the diameters according to the mass of the ice blocks J1 to be pushed down. The average diameter of the ice blocks J1 may for example be larger than or as large as 0.3 m.

The separating structure 100 may at times hit thick ice blocks or pack-ice, so it is preferable to dimension it to be heavy. The thickness d3 of the rails may be for example in the range 2-5 cm or in the range 1-5% of the thickness of the fast ice to be broken.

Ice blocks J1 and/or ice sludge which has passed through the rails 12 end up in the oil speck B4 (FIGS. 3a, 4a and 4c) and may obstruct the handling of the oil in the oil collecting unit 200.

It may at times be necessary to remove ice blocks J1 and/or ice sludge from in front of the oil collecting unit 200 or the oil guiding boom 30. The vessel 500 may for example have means for temporarily lifting the oil guiding boom 30 or the oil collecting unit 200 out of the water. The ice blocks J1 and/or ice sludge will then be able to leave the space between the middle hull SH1 and the side hull SH2. A disadvantage may however be that at least a part of the oil speck B4 will then pass back into the sea.

Figure 4D:
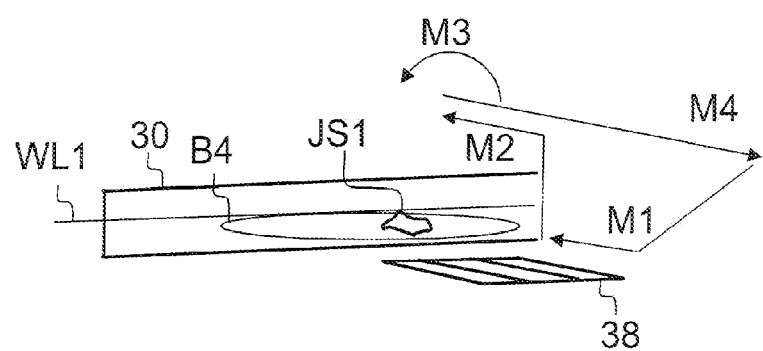
FIG. 4d shows in a three-dimensional manner a sieving device, which is arranged to remove small ice blocks, which have passed through the separating structure.

Referring to FIG. 4d, ice sludge ending up in the oil speck B4 can be removed into the sea for example with a mechanical sieve 38, which is fitted to scoop small ice blocks JS1 and/or ice sludge out from the oil speck B4. An actuating machinery may be connected to the sieve 38, which actuating machinery moves the sieve 38 for example according to the paths M1, M2, M3 and M4. Path M1 takes the sieve 38 underneath the ice block JS1. Path M2 lifts the sieve 38 up from the water surface WL1 and takes the sieve 38 behind the boom 30. Path M3 dumps the ice block JS1 into the sea behind the boom 30. Path M4 returns the sieve 38 in front of the boom 30.

Ice sludge ending up in the oil speck B4 can also be removed manually for example with a shovel. On the separating structure 100 there may for example for this purpose be one or more service bridges, which have a walking level and handrails.

Referring back to FIGS. 3a and 4a, the collecting of oil can partly be intensified by blowing gas, for example pressurized air, under the middle hull SH1 and/or side hulls SH2, SH3 through a gas duct 190. The air, which rises along the bottom of the hulls SH1, SH2, SH3, partly gathers along with it the oil, which is under the bottom and on the sides, and intensifies its rising through the separating structure 100. Said gas bubbles may also reduce the friction between the hulls and the ice.

As the draught of the vessel may increase as the container 300 is filled with the collected oil, the optimal travel depth of the vessel 500, with regards to ice-breaking and oil-collecting, can be controlled for example with ballast tanks.

The collected oil or oil/water mixture can also be pumped to a barge outside the vessel 500.

The vessel 500 may have devices for adjusting the height of the separating structure 100 in relation to the middle hull SH1 and/or the water surface WL1.

The vessel 500 may have devices for lifting the separating structure 100 up from the water when the vessel 500 is not used for collecting oil.

The separating structure 100 may be attached with members, which enable the movement of the separating structure upwards and/or backwards, if the forces, which the ice exerts on the separating structure, momentarily grow to be so large that there is a danger of damage to the structures.

The separating structure 100 may also be for example a steel plate, which has openings with a diameter of 5-10 cm.

Referring to the FIGS. 1a-3a and 4a, by trimaran is meant a ship, boat or other vessel, which has three substantially adjacent hulls. The length along the waterline of the middle hull SH1 of a small trimaran may be for example in the range 10-20 m. The length along the waterline of the middle hull of a medium-sized trimaran may be for example in the range 20-50 m. The length along the waterline of the middle hull of a large trimaran may be for example in the range 50-100 m. The length along the waterline of the middle hull of a very large trimaran may be for example in the range 100-300 m.

The width of the middle hull SH1 can be for example in the range 13-24% of the length along the waterline of the middle hull SH1, the width of the side hulls SH2, SH3 can be for example 2-8% of the length along the waterline of the middle hull SH1, and the distance of the side hulls SH2, SH3 from the middle hull SH1 can be for example 6-12% of the length along the waterline of the middle hull SH1.

The displacement of the middle hull SH1 can be for example 70-95% of the displacement of the entire vessel 500, and preferably 80-90% of the displacement of the entire vessel 500. The side hull's SH2, SH3 portion of the displacement of the vessel 500 can thus preferably be 5-10%.

The vessel 500 can, in addition to the middle hull SH1 and the side hulls SH2, SH3, also have one or more additional hulls. The additional hulls can be situated on the sides of the side hulls SH2, SH3 and/or behind the hulls SH1, SH2, SH3.

Two trimarans 500 can be joined together to travel beside each other.

Referring back to FIG. 1c, the middle hull SH1 can be tapered toward the stern, starting from the point where the side hulls SH2, SH3 essentially start to break ice. Thereby the moving of the ice blocks between the hulls SH1, SH2 backwards in a narrowing space, is avoided.

For the sake of the collecting efficiency it is most preferable to place the oil collecting unit 200 or guiding means 30 as close to the stern of the vessel 500 as possible, whereby is obtained a retention time for the ice blocks J1 underneath the separating structure 100, which retention time is as long as possible when taking into account the length and speed of the vessel 500.

The oil collecting unit may have means for separating the oil from the water. The oil collecting unit 200 may have for example a brush peeler, i.e. a brush skimmer (not shown), which has a rotating or moving brush. The brush is placed so that its bristles pass underneath the surface of the oil speck B4, whereby part of the oil adheres to the brush. The adhered oil can be separated by wiping or compressing the bristles. The oil, which has separated from the bristles, can be pumped into the container 300.

The oil collecting unit 200 may have a suction nozzle, which is held precisely at the height of the surface of the oil speck B4. When suctioning with the nozzle, mainly oil instead of water can thus be collected. Electric, pneumatic or hydraulic actuators and/or floats can be used for the height adjustment of the nozzle. The oil collecting unit may thus have a suction skimmer.

The oil collecting unit 200 may have a belt, ribbon or other moving surface, which sweeps the oil in the oil speck B4. A part of the oil adheres to the belt, wherefrom it can later be wiped or compressed off into the collecting container 300. The oil collecting unit may thus have a belt skimmer.

The oil collecting unit 200 may have a cyclone for separating the oil from the water. The oil collecting unit may thus have a cyclone skimmer.

Figure 6:
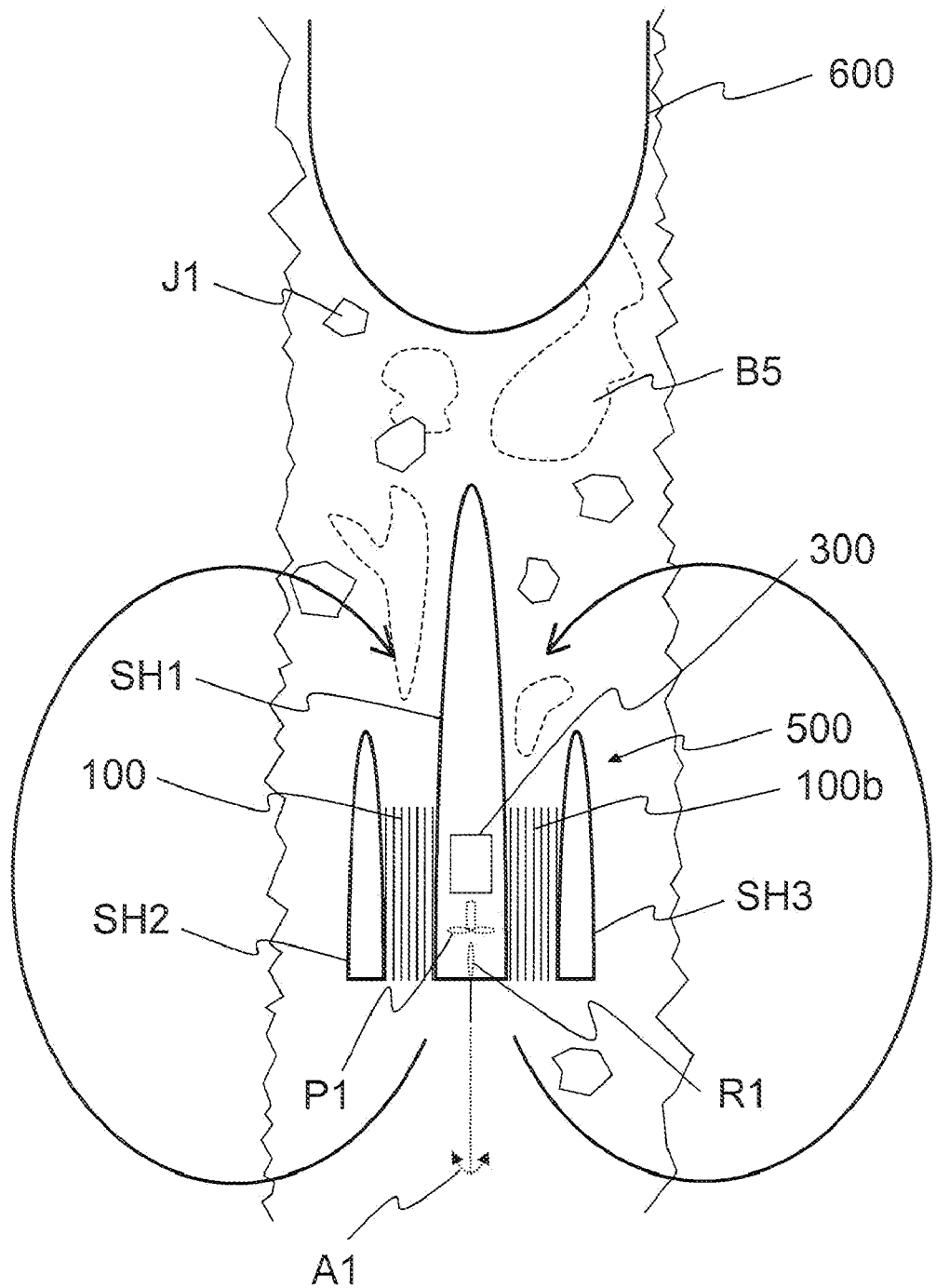
FIG. 6 shows in an exemplary manner a situation, where an oil combatting vessel according to an embodiment of the invention is collecting oil at an oil spill site.

In FIG. 6 is shown a situation, where an oil tanker 600 has got into an accident in icy conditions, as a result of which oil B5 has spilled into the waters from the tanker 600. The oil tanker 600 may for example have run aground or forcefully hit the edge of a passage made in the ice, whereby an opening has been ripped in the side or bottom of the tanker 600, wherefrom oil can flow into the waters.

An oil combatting vessel 500 has arrived at the accident site to collect the oil B5, which has spilled from the oil tanker 600, and thus to control the oil damage. If the oil combatting vessel 500 has arrived at the accident site quickly, the oil B5 leaking from the tanker 600 has not had time to spread to a wide area, but the oil B5 is mainly in the vicinity of the oil tanker 600. Thereby it is not necessarily worth collecting the oil B5 by moving the vessel 500 around the oil tanker 600 while breaking ice, as the procedure would probably spread the oil B5 to a wider area and mix up the oil B5 among the ice sludge and ice blocks J1. This would in turn make the collecting of the oil B5 significantly more difficult.

As shown in FIG. 6, the vessel 500 is attached with an anchor A1 substantially in its place in relation to the bottom of the waters. After attaching the vessel 500, the propulsion device P1 of the vessel 500 is used to move the water around the vessel 500. As shown, flows (marked with arrows in the figure) are achieved with the propulsion device P1, which flows guide the oil B5, ice sludge and ice blocks J1 towards the prow of the oil combatting vessel 500, especially towards the separating structures 100, 100b arranged between the middle hull SH1 and the side hulls SH2, SH3 of the vessel. The separating structure 100, 100b allows the water and oil to pass through the separating structure 100, 100b to the substantially ice-free water. The separating structure 100, 100b separates the oil from the ice blocks, whereby the collecting of the oil is made significantly easier. The oil, which has separated and risen towards the surface, is collected with a collecting device into the container 300. Even though the vessel 500 is in this context arranged substantially in its place in relation to the bottom of the waters, the separating structure 100, 100b still pushes ice downwards, due to the flow of water, which is achieved with the propulsion device P1, and the vertical movement of the vessel 500 in relation to the bottom. If ice is still packed against the prow of the vessel 500, the vessel 500 can, when necessary, be moved in order to remove the packed ice from the separating structure 100, 100b.

The flow field achieved with the propulsion device P1 extends to a wide area around the vessel 500. As shown in FIG. 6, flows are achieved with the propulsion device P1, which flows reach outside of the passage, under the fast ice. The water flow can be guided with a rudder R1 arranged in connection with the vessel 500. By changing the position of the rudder R1, the flow of water around the vessel 500 can be altered, so that the oil B5 travels as effectively as possible toward the prow of the vessel 500 and onwards through the separating structure 100, 100b for collection.

The invention is not limited only to the embodiments described above in the description and figures. The object is to limit the invention only to the scope presented in the following claims.

The invention claimed is:

1. An oil collecting vessel defining a longitudinal direction, and having at least three hulls for movement over a water surface, comprising:
   a middle hull, having a length in a length direction in the direction in which the vessel travels;
   a first side hull, joined to the middle hull on a first side;
   a second side hull joined to the middle hull on a second side opposite the first side;
   a separating structure mounted between the middle hull and the first side hull for separating oil from among ice blocks, wherein said separating structure has a first part of a first length in the length direction, and mounted between the middle hull and the first side hull and arranged at an incline to the horizontal so as to push ice blocks moving between the middle hull and the first side hull under water when the vessel is moving, and wherein said separating structure has at least one part which is water and oil permeable;

an oil collecting unit positioned above the separating structure and arranged in oil, or oil and water, receiving relation to oil, or oil and water, which passes through said separating structure;

wherein the separating structure is mounted immobilely in relation to the middle hull without active vibration of the separating structure; and wherein the separating structure further has a second part substantially horizontal and longer in the length direction than the first part and arranged to receive ice blocks from the first part and keep said ice blocks moving under the second part and under water.

2. The vessel of claim 1 wherein the first part is oil and water permeable.

3. The vessel of claim 1 wherein the second part is oil and water permeable.

4. The vessel of claim 1 wherein the separating structure is a grate, which has an essentially smooth underside which extends in the longitudinal direction for facilitating the gliding of the ice blocks.

5. The vessel of claim 1 wherein the first part has an underside, the first part underside mounted at an angle of between 10 and 30 degrees to a water surface defined between the middle hull and the first side hull.

6. The vessel of claim 1 wherein the middle hull has a waterline length in the longitudinal direction, and wherein the separating structure is arranged to keep the ice blocks underneath the water surface for a distance, which is at least as long as 30% of the waterline length of the middle hull.

7. The vessel of claim 1 wherein the oil collecting unit is situated in the middle or first or second side hull; and further comprises an oil guiding structure which is mounted to form a diagonal in relation to the middle hull, which oil guiding structure is arranged to collect oil which has passed through said separating structure, and to guide oil into the oil collecting unit while the vessel is moving.

8. The vessel of claim 7 wherein the vessel has at least one pump which is arranged to transfer oil to said oil collecting unit.

9. The vessel of claim 1 wherein the vessel further comprises means for removing ice sludge or small ice blocks, which have passed through the separating structure, from oil on a water surface before the oil is collected from the water surface.

10. The vessel of claim 1 wherein the vessel comprises at least one gas duct arranged to lead gas under the waterline of the middle hull, so that the transfer of the oil under or on the sides of said middle hull through said separating structure is intensified.

11. The vessel of claim 1 wherein the separating structure is adjustable to adjust the height of the separating structure.

12. A method for collecting oil with a moving vessel having at least a middle hull and two side hulls from a water surface covered by ice or ice blocks, the method comprising the steps of:

pushing the ice blocks under the water surface using a separating structure attached between the middle hull and one of said side hulls of the moving vessel, to separate oil from the ice blocks;

wherein said separating structure has a first part of a first length in a length direction, and mounted between the middle hull and the first side hull and arranged at an incline to the horizontal so as to push ice blocks moving between the middle hull and the first side hull under water when the vessel is moving;

wherein the separating structure further has a second part substantially horizontal and longer in the length direction than the first part and which receives ice blocks from the first part and keeps said ice blocks moving under the longer second part and under water;

wherein the separating structure is held immobile in relation to the middle hull so that the separating structure vibrates only by the influence of forces caused by the ice blocks and vibration of a propulsion device or propulsion devices of the vessel; and collecting, at least partly, oil which has passed through said separating structure and been separated from said ice blocks that were pushed down under the water surface using the separating structure.

13. The method of claim 12 wherein the ice blocks glide in a longitudinal direction over an essentially smooth underside of a grate, which forms the separating structure.

14. The method of claim 13 wherein the grates smooth underside extends at an angle of between 10 and 30 degrees with respect to the water surface, and wherein the ice blocks glide along the smooth underside of the grate at said angle of between 10 and 30 degrees.

15. The method of claim 12 wherein the ice blocks are held underneath the water surface for a distance, which is at least 30% of a length defined by the middle hull along the middle hull's waterline.

16. The method of claim 12 wherein oil which has passed through said separating structure is collected into an oil collecting unit situated in the middle hull or one of the sides hull by being guided by an oil guiding structure which is arranged diagonally in relation to the middle hull of the vessel.

17. The method of claim 16 further comprising the step of pumping oil from beside the hulls of the vessel to the oil collecting unit.

18. The method of claim 12 further comprising leading gas under or to the sides of the middle hull and using said gas to move oil under or on the sides of the middle hull through said separating structure.

19. The method of claim 12 further comprising at least partly removing ice sludge or small ice blocks, which have passed through said separating structure, from the oil on the water surface before said oil is collected from the water surface.

20. The method of claim 12 further comprising breaking fast ice with said vessel.

21. The method of claim 20 wherein the step of breaking fast ice is arranged to form ice blocks of an average diameter of at least 0.3 meters which are broken off from the fast ice with said vessel and which ice blocks are pushed down with the separating structure.

22. The method of claim 20 further comprising selecting the vessel dimensions, draught and travel speed so that the average diameter of the ice blocks which are broken off from the fast ice and which are pushed down with the separating structure, is at least as large as a third of a distance measured between the middle hull and one of the side hulls of the vessel, wherein said average diameter is calculated as weighted according to the mass of said ice blocks that are pushed down.

23. The method of claim 12 further comprising:

fixing the vessel substantially in its place in relation to a bottom underlying the water area;

moving water around the vessel to form streams which guide the oil in the water area toward a separating structure attached between the middle hull and one of the side hulls of the vessel; and at least partly collecting the oil which passes through said separating structure.

24. The method of claim 23 wherein the separating structure comprises a grate with an essentially smooth underside, and the ice blocks glide in a longitudinal direction over the underside of the grate.

25. The method of claim 24 wherein the grate is disposed at an angle of between 10 and 30 degrees with respect to the water surface.

26. The method of claim 23 wherein oil which has passed through said separating structure is collected into an oil collecting unit situated in the middle hull or one of the sides hull by being guided by an oil guiding structure which is arranged diagonally in relation to the middle hull of the vessel.

27. The method of claim 26 further comprising the step of pumping oil from beside the hulls of the vessel to the oil collecting unit.

28. The method of claim 23 further comprising leading gas under or to the sides of the middle hull and using said gas to move oil under or on the sides of the middle hull through said separating structure.

29. The method of claim 23 further comprising at least partly removing ice sludge or small ice blocks which have passed through said separating structure from the oil on the water surface before said oil is collected from the water surface.

* * * * *